(12) United States Patent
Lee et al.

(10) Patent No.: US 11,832,287 B2
(45) Date of Patent: Nov. 28, 2023

(54) ELECTRONIC DEVICE FOR WIRELESS COMMUNICATION AND METHOD OF OPERATING ELECTRONIC DEVICE

(71) Applicant: Samsung Electronics Co., Ltd., Gyeonggi-do (KR)

(72) Inventors: Ukho Lee, Gyeonggi-do (KR); Taesik Yun, Gyeonggi-do (KR)

(73) Assignee: Samsung Electronics Co., Ltd

( * ) Notice: Subject to any disclaimer, the term of this patent is extended or adjusted under 35 U.S.C. 154(b) by 211 days.

(21) Appl. No.: 17/331,242

(22) Filed: May 26, 2021

(65) Prior Publication Data

US 2021/0377958 A1 Dec. 2, 2021

(30) Foreign Application Priority Data

May 26, 2020 (KR) .................. 10-2020-0063113

(51) Int. Cl.
*H04W 4/00* (2018.01)
*H04W 72/541* (2023.01)
(Continued)

(52) U.S. Cl.
CPC ............ *H04W 72/541* (2023.01); *H04W 4/80* (2018.02); *H04W 84/12* (2013.01)

(58) Field of Classification Search
CPC .............................. H04W 4/80; H04W 84/12
See application file for complete search history.

(56) References Cited

U.S. PATENT DOCUMENTS 7,684,464 B2    3/2010  Linsky et al.
9,136,902 B2 *  9/2015  Chang ................. H04B 1/7143
(Continued)

FOREIGN PATENT DOCUMENTS

CN      106792954       5/2017
KR    1020120024790     3/2012
(Continued)

OTHER PUBLICATIONS

International Search Report dated Sep. 1, 2021 issued in counterpart application No. PCT/KR2021/006552, 6 pages.
(Continued)

*Primary Examiner* — Chi H Pham
*Assistant Examiner* — Elisabeth Benoit Magloire
(74) *Attorney, Agent, or Firm* — The Farrell Law Firm, P.C.

(57) ABSTRACT

Disclosed is an electronic device including a first communication circuit configured to support a first communication scheme, a second communication circuit configured to support a second communication scheme and at least one processor connected to the first communication circuit and the second communication circuit, wherein the memory stores instructions configured to, when executed, enable the processor to enable first communication of the first communication scheme, control the first communication circuit to perform the first communication with an external device, enable second communication of the second communication scheme, based on a channel map of the first communication when first information related to a network state of the first communication satisfies a first predetermined condition, acquire second information related to the second communication, and modify the channel map by blocking one of a plurality of channels in the channel map when the second information satisfies a second predetermined condition.

20 Claims, 7 Drawing Sheets

(51) Int. Cl.
*H04W 84/12* (2009.01)
*H04W 4/80* (2018.01)

(56) References Cited

U.S. PATENT DOCUMENTS

| | | | |
|---|---|---|---|
| 10,708,887 B1* | 7/2020 | Evans | H04W 72/542 |
| 2006/0030265 A1 | 2/2006 | Desai et al. | |
| 2006/0133543 A1* | 6/2006 | Linsky | H04B 1/715 |
| | | | 375/350 |
| 2006/0270348 A1* | 11/2006 | Ibrahim | H04B 1/3805 |
| | | | 455/41.2 |
| 2007/0161349 A1 | 7/2007 | Grushkevich | |
| 2010/0322287 A1 | 12/2010 | Truong et al. | |
| 2011/0149768 A1 | 6/2011 | Kang et al. | |
| 2013/0022034 A1 | 1/2013 | Grushkevich | |
| 2013/0077655 A1* | 3/2013 | Chen | H04B 1/715 |
| | | | 375/135 |
| 2014/0192664 A1* | 7/2014 | Ericson | H04W 24/08 |
| | | | 370/252 |
| 2014/0334396 A1 | 11/2014 | Lee et al. | |
| 2016/0080946 A1 | 3/2016 | Grushkevich | |
| 2017/0134882 A1 | 5/2017 | Kao et al. | |
| 2018/0352551 A1 | 12/2018 | Lou et al. | |
| 2020/0120468 A1 | 4/2020 | Ling et al. | |

FOREIGN PATENT DOCUMENTS

| | | | |
|---|---|---|---|
| KR | 10-2014-0132876 | 11/2014 | |
| KR | 10-1688963 | 12/2016 | |
| WO | WO 2020/023303 | 1/2020 | |
| WO | WO-2020023303 A1 * | 1/2020 | G06F 3/14 |

OTHER PUBLICATIONS

European Search Report dated Jul. 24, 2023 Issued in counterpart application No. 21812335.4-1215, 23 pages.

* cited by examiner

ELECTRONIC DEVICE FOR WIRELESS COMMUNICATION AND METHOD OF OPERATING ELECTRONIC DEVICE

CROSS-REFERENCE TO RELATED APPLICATION(S)

This application is based on and claims priority under 35 U.S.C. § 119 to Korean Patent Application No. 10-2020-0063113, filed on May 26, 2020, in the Korean Intellectual Property Office, the disclosure of which is incorporated herein by reference in its entirety.

BACKGROUND

1. Field

The disclosure relates to an electronic device for wireless communication and a method of operating an electronic device.

2. Description of Related Art

Various electronic devices are provided to users. Such devices may be connected to external devices through wireless communication technology and may transmit and receive various types of information to and from the external devices.

Recently, according to popularization of various wireless communication schemes such as wireless fidelity (Wi-Fi) and Bluetooth™ (BT), various electronic devices have been developed to provide the Wi-Fi and BT communication schemes.

For example, Wi-Fi is a technology for performing wireless communication within a predetermined distance in a place where a wireless access device (access point (AP)) is installed through radio waves and may use a frequency in 2.4 gigahertz (GHz) and 5 GHz bands as industrial scientific and medical (ISM) bands.

Among various wireless communication schemes, BT is a wireless personal area network (WPAN) technology and is widely used to transmit a voice through wireless communication. In communication between an electronic device and a BT device, the BT communication scheme may select and use one of frequencies (for example, 80 frequencies) distributed at predetermined intervals (for example, 1 megahertz (MHz)) rather than a fixed frequency through frequency hopping which is a wireless communication algorithm.

Various wireless communication schemes such as Wi-Fi and BT may use the same frequency band. Accordingly, when BT communication is performed, collision with Wi-Fi communication using the same frequency may occur. In another example, when an electronic device performs BT communication and another electronic device performs BT communication, collision may occur. In such a complex environment, throughput deteriorates and interference is generated in the case of the Wi-Fi communication scheme and a packet error rate (PER) may increase in the case of the BT communication scheme. For example, the electronic device using different communication schemes using the same frequency band may experience data loss.

As such, there is a need in the art for a method and an electronic device that mitigates such instances of deteriorating throughput, interference and increased PER in wireless communication using the same frequency.

SUMMARY

Accordingly, the present disclosure provides embodiments that are designed to address at least the problems and/or disadvantages described above and to provide at least the advantages described below.

An aspect of the disclosure is to provide an electronic device that smoothly performs wireless communication in a network environment through different communication schemes using the same frequency band and a method of operating the electronic device.

Another aspect of the disclosure is to provide an electronic device that reduces wireless communication cut-off by maintaining more channels for hopping by performing channel blocking when whether to block previously used channels in channel hopping is identified and a predetermined condition is satisfied.

In accordance with an aspect of the disclosure, an electronic device may include a first communication circuit configured to support a first communication scheme; a second communication circuit configured to support a second communication scheme; and at least one processor connected to the first communication circuit and the second communication circuit, wherein the memory stores instructions configured to, when executed, enable the processor to enable first communication of the first communication scheme control the first communication circuit to perform the first communication with an external device, enable second communication of the second communication scheme, based on a channel map of the first communication when first information related to a network state of the first communication satisfies a first predetermined condition, acquire second information related to the second communication, and modify the channel map by blocking one of a plurality of channels in the channel map when the second information satisfies a second predetermined condition.

In accordance with another aspect of the disclosure, a method of operating an electronic device may include enabling first communication of a first communication scheme and performing the first communication with an external device; when first information related to a network state of the first communication satisfies a first predetermined condition, enabling second communication of a second communication scheme, based on a channel map of the first communication; acquiring second information related to the second communication; and when the second information satisfies a second predetermined condition, modifying the channel map by blocking one of a plurality of channels in the channel map.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Figure 1:
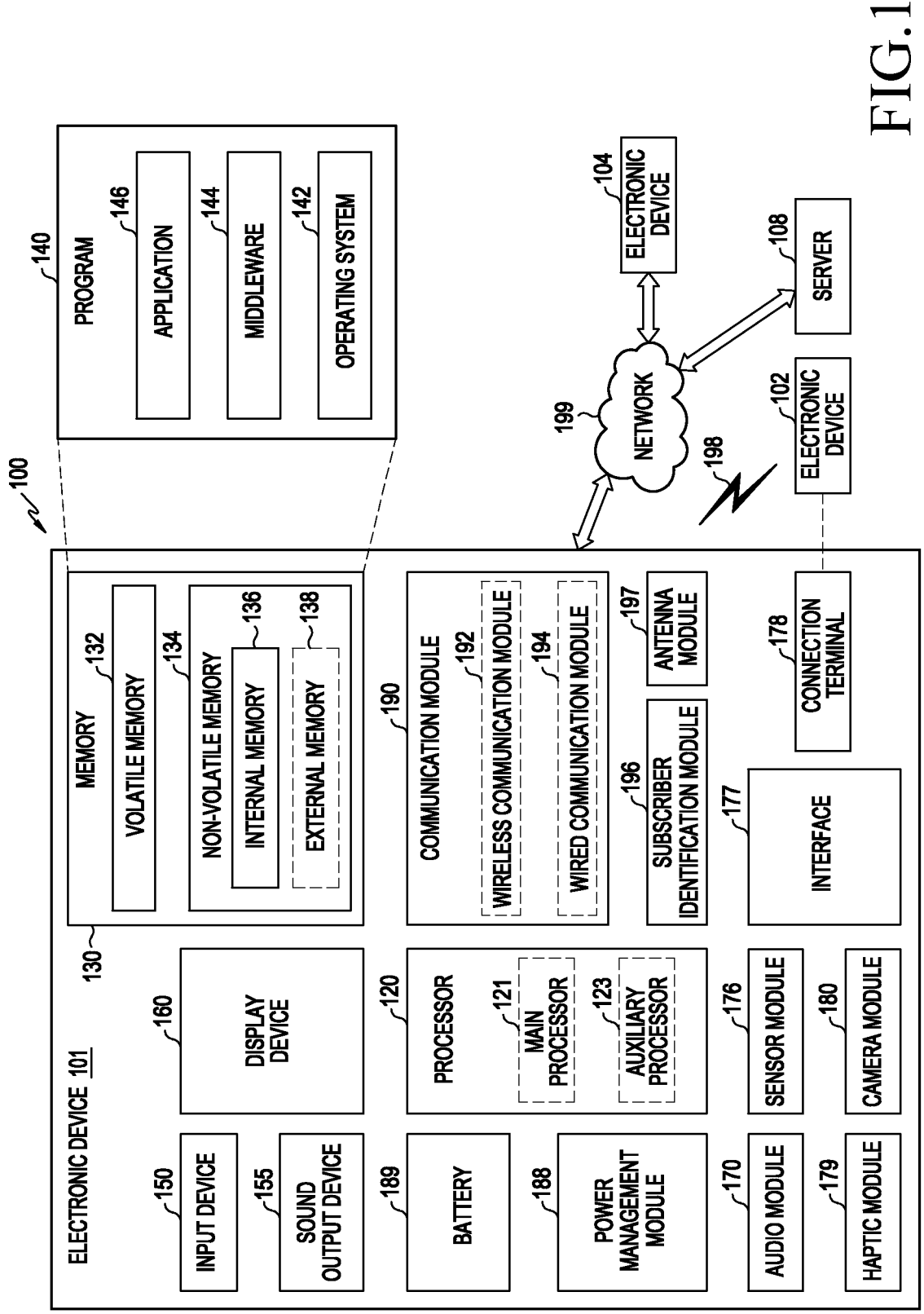
FIG. 1 is a block diagram illustrating an electronic device within a network environment according to various embodiments.

Hereinafter, an electronic device and method thereof are described with reference to the accompanying drawings. The term "user" used herein may refer to a person using an electronic device or a device using an electronic device, such as an artificial intelligence electronic device. Detailed descriptions of known functions and/or configurations will be omitted for the sake of clarity and conciseness.

The electronic device according to various embodiments may be one of various types of electronic devices including a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with "logic," "logic block," "part," or "circuitry". A module may be a single integral component, or a minimum unit or part thereof, adapted to perform one or more functions. For example, The module may be implemented in a form of an application-specific integrated circuit (ASIC).

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or Output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band the mm Wave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIDI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
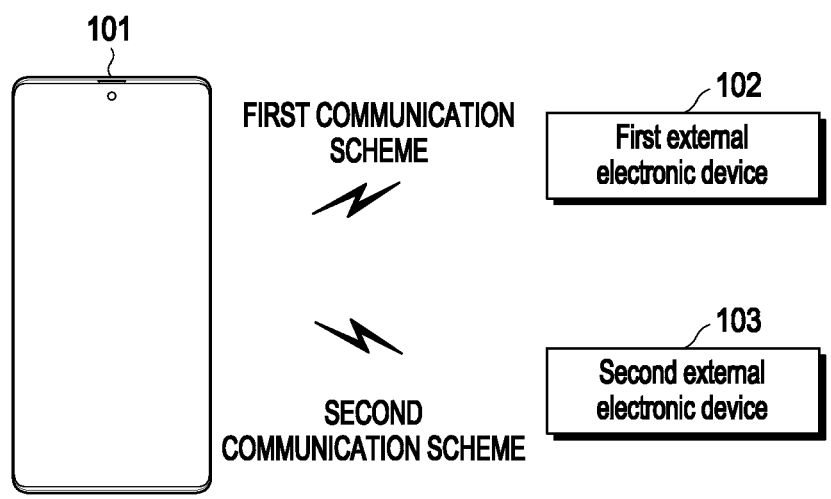
FIG. 2 illustrates a network environment between an electronic device and an external electronic device according to an embodiment.

FIG. 2 illustrates a network environment between an electronic device and an external electronic device according to an embodiment.

Referring to FIG. 2, an electronic device 101 (for example, the electronic device 101 of FIG. 1) according to an embodiment may be connected to a first external electronic device 102 (for example, the electronic device 102 of FIG. 1) through a first communication scheme and connected to a second external electronic device 103 through a second communication scheme. The first communication scheme may be BT and the second communication scheme may be Wi-Fi. According to an embodiment, the electronic device 101 may be capable of performing both first communication of BT and second communication of Wi-Fi. The first external electronic device 102 may be performing only the first communication, and the second external electronic device 103 may be performing only the second communication.

According to an embodiment, when performing first communication, the electronic device 101 may block a channel (for example, a first channel) (channel blocking) using adaptive frequency hopping (AFH) and perform hopping to, a second channel which is one of a plurality of channels (for example, 79 channels in units of 1 MHz) in a predetermined frequency band (for example, 2402 MHz to 2480 MHz). The electronic device 101 may perform channel hopping such that one of the plurality of channels in the predetermined frequency bands of the first communication is selected and used through AFH. The electronic device 101 may perform the first communication using an unblocked channel among a plurality of channels in a channel map of the first communication through AFH.

Figure 3:
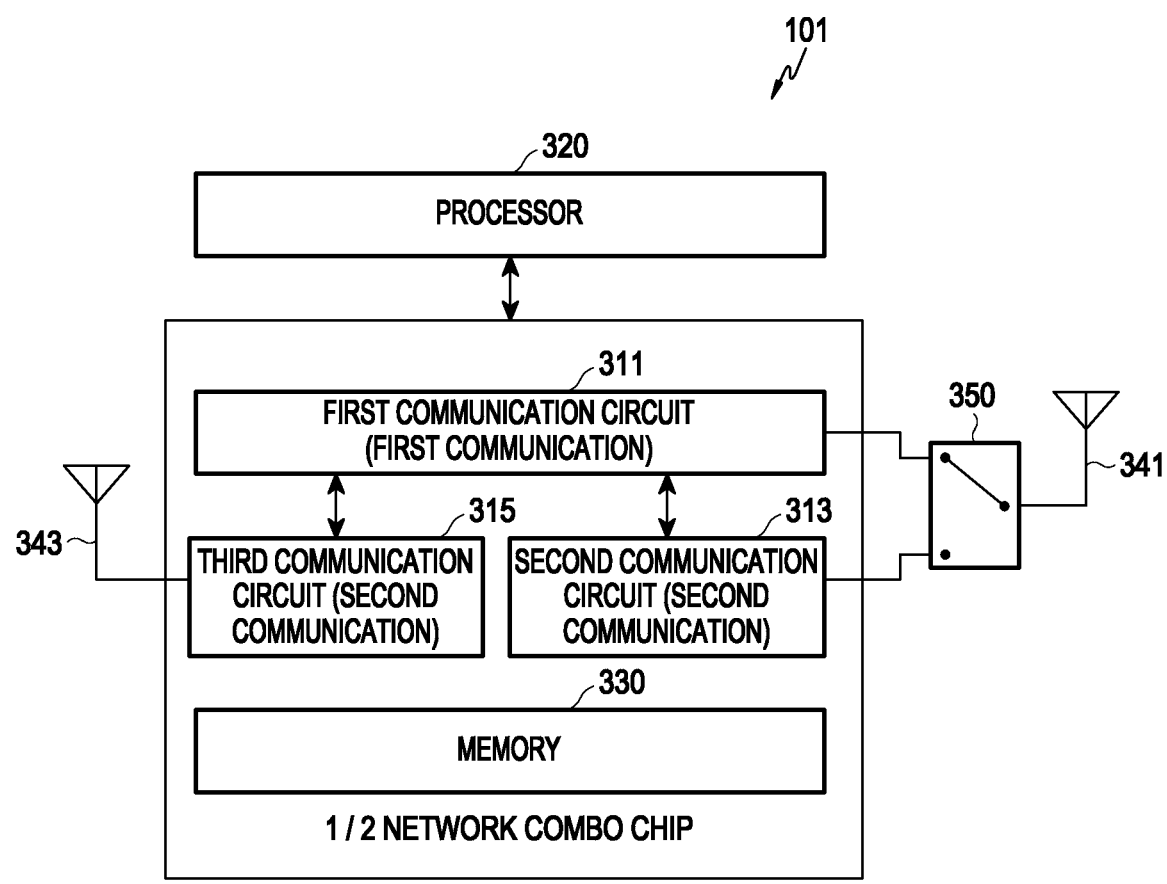
FIG. 3 illustrates a configuration of an electronic device according to an embodiment.

FIG. 3 illustrates a configuration of an electronic device according to an embodiment. Referring to FIG. 3, the electronic device 101 may include at least one first communication circuit 311, a second communication circuit 313, a third communication circuit 315, a processor 320, a memory 330, a first antenna 341, and/or a second antenna 343. The electronic device 101 may further include a switch 350 connected to the first antenna 341 between the first communication circuit 311 and the second communication circuit 313.

According to an embodiment, the first communication circuit 311 may support a first communication scheme (for example, BT) and configure a selective connection to the first antenna 341 through the switch 350. The first communication circuit 311 may perform the first communication (for example, the BT communication) with a first external electronic device (for example, the first external electronic device 102 of FIG. 1) through the first antenna 341. The second communication circuit 313 may support a second communication scheme (for example, Wi-Fi) and configure a selective connection to the first antenna 341 through the switch 350. The second communication circuit 313 may perform the Wi-Fi communication with a second external electronic device (for example, the second external electronic device 103 of FIG. 1) through the first antenna 341. According to an embodiment, the second communication circuit 313 may transmit information related to the second communication of the second communication scheme (for example, second information) to the processor 320 or the first communication circuit 311.

The third communication circuit 315 may be configured to support the second communication scheme and is connected to the second antenna 343, and may perform the second communication with an external electronic device (for example, the second external electronic device 103 of FIG. 1) through the second antenna 343. According to an embodiment, at least one processor 320 (for example, the processor 120 of FIG. 1) may be electrically connected to the first communication circuit 311 and control the first communication circuit 311 to perform the first communication with the first external device through the first channel. At least one processor 320 may be electrically connected to the second communication circuit 313 and/or the third communication circuit 315 and controls the second communication circuit 313 and/or the third communication circuit 315 to perform the second communication with the second external electronic device.

According to an embodiment, at least one processor 320 may enable the first communication of the first communication scheme.

According to an embodiment, when performing the first communication with the first external device through an $n^{th}$ channel (hereinafter, a first channel), the at least one processor 320 may acquire information on the first channel (hereinafter, first information) and identify a network state of the first communication based on the acquired first information. The at least one processor 320 may store the acquired first information in the memory 130 of the electronic device. The first information may include at least one of identification information of the first channel, a packet error rate (PER) of the first channel, a received signal strength indicator (RSSI) of the first channel, or the existence or nonexistence of the second communication. According to an embodiment, at least one processor 320 may perform channel hopping in a plurality of channels in a channel map of the first communication through AFH.

The channel map of the first communication may be configured to randomly perform channel hopping according to a preset rule. For example, the channel map of the first communication may be a channel table configured to perform channel hopping using a channel having a good channel state without using a channel having a poor channel state according to a communication network state. The at least one processor 320 may be configured to perform a channel hopping operation according to a preset hopping rule separately from an operation of modifying or generating a channel map by reflecting channel blocking and/or unblocking. The at least one processor 320 may be configured to randomly select a channel from among a plurality of unblocked channels in the channel map of the first communication in predetermined time units and perform channel hopping through the selected channel while the first communication is performed.

According to an embodiment, when the network state of the fist communication satisfies a predetermined condition (for example, a first predetermined condition), the at least one processor 320 may enable the second communication. For example, when the first information on the first channel satisfies the first predetermined condition, the second communication may be enabled. The first predetermined condition may include a condition corresponding to a PER of the first channel which is greater than or equal to a predetermined error rate or information on a signal strength which is less than or equal to a predetermined value (for example, −80). In another example, the at least one processor 320 may be configured to enable the second communication based on the number of blocked channels among the plurality of channels of the first communication. For example, when the number of channels which can be used in the channel map of the first communication is less than or equal to a predetermined reference number (for example, 40) or the number of blocked channels is greater than the predetermined reference numeral (for example, 40), the at least one processor 320 may be configured to enable the second communication.

According to an embodiment, at least one processor 320 may acquire the second information related to the second communication in response to enabling the second communication and block one of the plurality of channels in the channel map of the first communication based on the acquired second information. For example, the one channel may be an unblocked channel in the channel map of the first communication. The second information may include identification information of the second communication, channel information of the second communication, and information on the signal strength of the second communication. For example, the identification information of the second communication may be information for identifying whether there is a signal of the second communication. According to an embodiment, when a channel having the acquired second information which satisfies a predetermined condition (for example, a second predetermined condition) is an $m^{th}$ channel (for example, a first channel) in the channel map of the first communication, at least one processor 320 may block the m channel (for example, the first channel) in the channel map of the first communication and modify the channel map by reflecting blocking of the $m^{th}$ channel. The predetermined condition (for example, the second predetermined condition) may be, for example, a condition for identifying whether there is interference by the second communication.

According to an embodiment, at least one processor 320 may identify interference by the second communication by identifying whether there is the signal of the second communication and the signal strength. For example, when there is the signal of the second communication based on identification information of the second communication included in the acquired second information and information on the signal strength included in the acquired second information is greater than or equal to a reference strength value, the at least one processor 320 may identify that there is interference by the second communication.

According to an embodiment, when the $m^{th}$ channel has interference by the second communication based on the second information on the $m^{th}$ channel, the at least one processor 320 may block the $m^{th}$ channel and modify the channel map. In another example, when the $m^{th}$ channel does not have interference by the second communication based on the second information, the at least one processor 320 may not block (i.e., refrains from blocking) the $m^{th}$ channel. For example, when the generation of interference by the signal of the second communication is identified, the at least one processor 320 may identify that a frequency corresponding to the $m^{th}$ channel of the first communication (for example, 2102 MHz corresponding to a BT $m^{th}$ channel) acts as interference in at least a portion of a frequency band corresponding to the channel of the second communication (for example, 2402 to 2422 MHz corresponding to a Wi-Fi channel no. m).

According to an embodiment, when the number of blocked channels among the plurality of channels in the channel map of the first communication is greater than or equal to the predetermined reference number (for example, 40 (40 MHz)) or the number of available channels is less than or equal to the predetermined reference number (for example, 40 (40 MHz)), the at least one processor 320 may enable the second communication by the second communication circuit 313. The at least one processor 320 may determine to unblock one of the plurality of blocked channels in the channel map of the first communication based on the existence or nonexistence of the signal of the second communication and the strength of the signal of the second communication. Accordingly, the at least one processor 320 may increase the number of unblocked channels for adaptive frequency hopping in the channel map of the first communication.

After unblocking one of the plurality of blocked channels, the at least one processor 320 may disable the second communication by the second communication circuit 313. For example, when the number of blocked channels among the plurality of channels in the channel map of the first communication is greater than or equal to the predetermined reference number (for example, 40 (40 MHz)) or the number of available channels is less than or equal to the predetermined reference number (for example, 40 (40 MHz)), the at least one processor 320 may enable the second communication by the second communication circuit 313 and unblock a channel which does not have interference by the signal of the second communication among the blocked channels.

According to an embodiment, when blocking one of the plurality of channels in the channel map of the first communication, at least one processor 320 may enable the second communication and store information (for example, second information) indicating the existence or nonexistence of the second communication to the channel to be blocked in the memory. According to an embodiment, At least one processor 320 may identify information on the blocked channel among the plurality of channels in the channel map of the first communication. For example, when the number of blocked channels among the plurality of channels in the channel map of the first communication is larger than or equal to the predetermined reference number (for example, 40 (40 MHz)) or the number of available channels is less than or equal to the predetermined reference number (for example, 40 (40 MHz)), at least one processor 320 may identify information on the blocked channel among the plurality of channels in the channel map of the first communication and may not unblock the channel having interference of the second communication on the basis of the identified information.

According to an embodiment, when the number of channels for channel hopping among the plurality of channels in the channel map of the first communication is less than or equal to a predetermined value, the at least one processor 320 may enable the second communication by the second communication circuit 313 and then identify at least one channel having a high priority of channel usage based on first information on the first communication and/or second information on the enabled second communication. The at least one processor 320 may unblock at least one identified channel having the high priority, and may unblock at least one channel having a higher priority, generate a new channel map by reflecting the unblocked channel, and change the channel map of the first communication to the generated channel map. For example, the priority may be determined based on whether there is interference by the second communication, a PER of the first communication, or a signal strength.

According to an embodiment, the memory 330 (for example, the memory 130 of FIG. 1) may be electrically connected to at least one processor 320, the first communication circuit 311, the second communication circuit 313, and/or the third communication circuit 315 and may store information according to execution of the first communication and the second communication processed by at least one processor 320. The memory 330 may store the first information on the first communication and the second information on the second communication.

A portion of the communication module 310 and the memory 330 illustrated in FIG. 3 may be included in a network combo chip.

Although the at least one processor 320 illustrated in FIG. 3 is described based on a processor configured separately from the network combo chip, the disclosure is not limited thereto and a portion of the at least one processor 320 may be included in the network combo chip.

The embodiments have described main elements of the electronic device through the electronic device 101 of FIG. 3. However, all the elements illustrated in FIG. 3 are not necessary elements and the electronic device 101 may be implemented by fewer or more elements than those illustrated. Further, locations of the main elements of the electronic device 101 illustrated in FIG. 3 may be changed according to embodiments.

Figure 4:
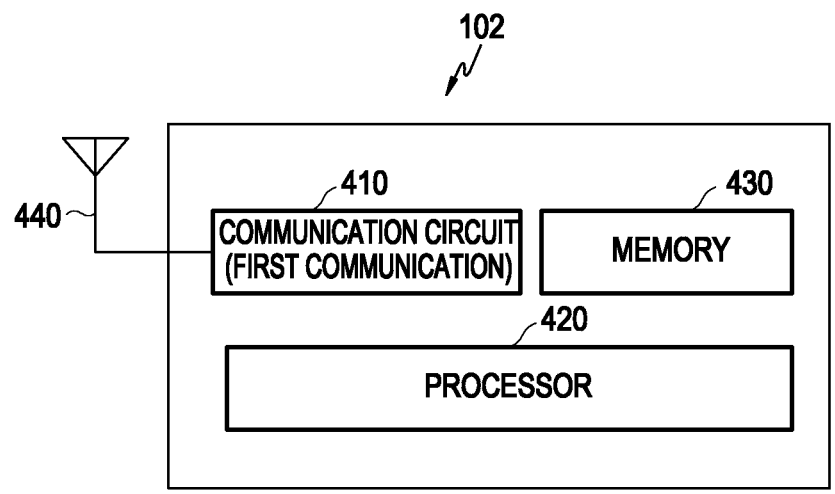
FIG. 4 illustrates a configuration of a first external electronic device according to an embodiment.

FIG. 4 illustrates a configuration of the first external electronic device according to an embodiment.

Referring to FIG. 4, the first external electronic device 102 (for example, the electronic device 102 of FIG. 1 or the first external electronic device 102 of FIG. 2) supports a first communication scheme (for example, BT) in an accessory device such as earphones, a speaker, or a USB, and may transmit and receive data with an electronic device (for example, the electronic device 101 of FIG. 1, 2, or 3) through first communication of the first communication scheme. The first external electronic device 102 may include a communication circuit 410 for first communication, a processor 420, a memory 430, and/or an antenna 440.

Figure 5:
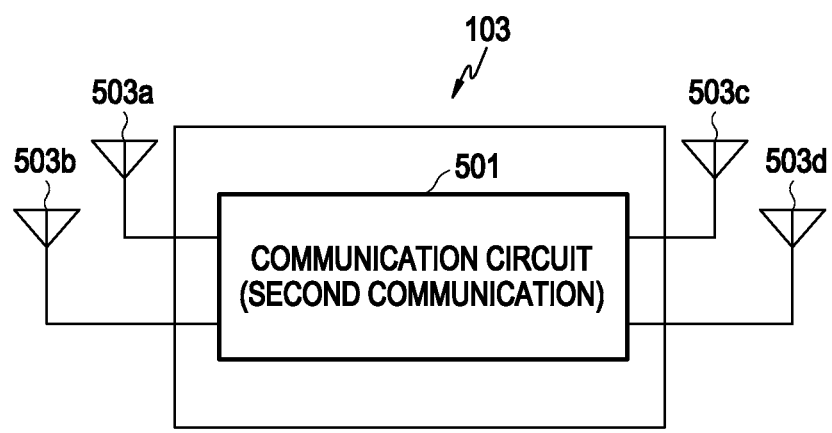
FIG. 5 illustrates a configuration of a second external electronic device according to an embodiment.

FIG. 5 illustrates a configuration of the second external electronic device according to an embodiment.

Referring to FIG. 5, the second external electronic device 103 (for example, the electronic device 102 of FIG. 1) according to an embodiment supports a second communication scheme (for example, Wi-Fi) and is a Wi-Fi router or an AP, and may transmit and receive data with an electronic device 101 through second communication of the second communication scheme. The second external electronic device 103 may include a communication circuit 501 for second communication and/or a plurality of antennas 503a, 503b, 503c, and 503d. The second external electronic device 103 may include at least one processor within or separately from the communication circuit 501.

Figure 6:
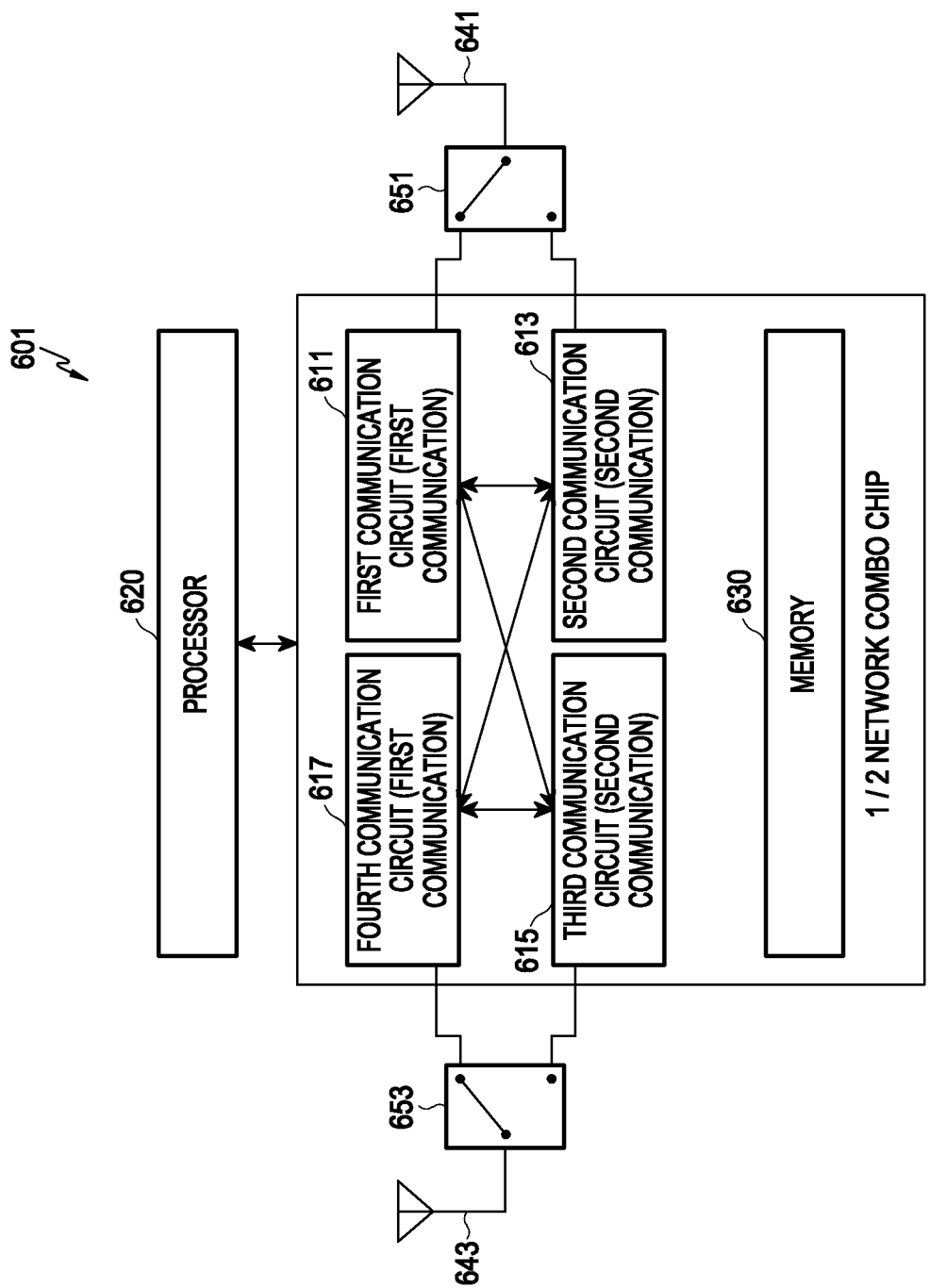
FIG. 6 illustrates example of the configuration of the second external electronic device according to an embodiment.

FIG. 6 illustrates an example of the configuration of the electronic device according to an embodiment.

Referring to FIG. 6, an electronic device 601 (for example, the electronic device 101 of FIG. 1 or 2) according to an embodiment may include a first communication circuit 611 (for example, the first communication circuit 311 of FIG. 3), a second communication circuit 613 (for example, the second communication circuit 313 of FIG. 3, or a third communication circuit 615 (for example, the third communication circuit 315 of FIG. 3), a fourth communication circuit 617, a processor 620, a memory 630, a first antenna 641, and/or a second antenna 643. The electronic device 601 may further include a first switch 651 connected between the first communication circuit 611 and the second communication circuit 613, and the first antenna 641. The electronic device 601 may further include a second switch 653 connected between the third communication circuit 615 and the fourth communication circuit 617, and the second antenna 643.

According to an embodiment, the first communication circuit 611 may be configured to be selectively connected to the first antenna 641 through the first switch 651 and to perform first communication (for example, BT communication) with the first external electronic device (for example, the first external electronic device 102 of FIG. 1) through the first antenna 641. The second communication circuit 613 may be configured to be selectively connected to the first antenna 641 through the first switch 651 and to perform second communication (for example, Wi-Fi communication) with the second external electronic device (for example, the second external electronic device 103 of FIG. 1) through the first antenna 641.

According to an embodiment, the third communication circuit 615 may be configured to be selectively connected to the second antenna 643 through the second switch 653 and to perform second communication (for example, Wi-Fi communication) with another external electronic device (for example, a fourth external electronic device through the second antenna 653. The fourth communication circuit 617 may be configured to be selectively connected to the second antenna 643 through the second switch 653 and to perform first communication (for example, BT communication with another external electronic device (for example, a third external electronic device through the second antenna 643. The first communication circuit 611 and the fourth communication circuit 617 may support a first communication scheme (for example, BT), and the second communication circuit 613 and the third communication circuit 615 may support a second communication scheme (for example, Wi-Fi). According to an embodiment, the first communication circuit 611 and the fourth communication circuit 617 may interwork with the second communication circuit 613 and the third communication circuit 615 and may transmit or receive information related to communication For example, the first communication circuit 611 and/or the fourth communication circuit 617 may acquire second information including channel identification information of the second communication and information on a signal strength according to the second communication from the second communication circuit 613 and/or the third communication circuit 615.

According to an embodiment, at least one processor 620 may be electrically connected to the first communication circuit 611 to control execution of the first communication through a first channel, and may be electrically connected to the fourth communication circuit 617 to control execution of the first communication through another channel. The at least one processor 620 may be electrically connected to the second communication circuit 613 and/or the third communication circuit 615 to control transmission or reception of data to or from an external electronic device through the second communication.

According to an embodiment, when enabling the first communication by the first communication circuit 611 to perform the first communication with the first external device through the first channel, the at least one processor 620 may acquire first information on the first channel (for example, first information) and identify a channel state of the first channel based on the acquired first information. When it is identified that the channel state of the first channel by the first communication circuit 611 is poor, the at least one processor 620 may identify interference by the second communication of the second communication scheme by the second communication circuit 613 and/or the third communication circuit 615.

The memory 630 may be substantially the same as the memory 330 illustrated in FIG. 3.

According to another embodiment, the first communication circuit 611 and the fourth communication circuit 617 perform first communication through different channels and perform hopping to different channels having a good communication state through adaptive frequency hopping. According to an embodiment, at least processor 620 may acquire first information on different channels of the first communication (for example, first information) by the fourth communication circuit 617 and identify channels states of the different channels based on the acquired first information. When it is identified that the channel state of the first channel by the fourth communication circuit 617 is poor, the at least one processor 620 may identify interference by the second communication of the second communication scheme by the second communication circuit 613 and the third communication circuit 615 having a good communication state to the fourth communication circuit 617 through AFH.

A portion of the first communication circuit 611, the second communication circuit 613, the third communication circuit 615, the fourth communication circuit 617, or the memory 630 illustrated in FIG. 6 may be included in a network combo chip.

Although the at least one processor 620 illustrated in FIG. 6 is described based on a processor formed separately from the network combo chip, the disclosure is not limited thereto and a portion of the at least one processor 620 may be included in the network combo chip.

The embodiments have described main elements of the electronic device through the electronic device 601 of FIG. 6. However, all the elements illustrated in FIG. 6 are not necessary and the electronic device 601 may be implemented by fewer or more elements than those illustrated.

Further, locations of the main elements of the electronic device 601 illustrated in FIG. 6 may be changed according to embodiments.

An electronic device (for example, the first electronic device 101 of FIG. 1, 2, or 3, or the electronic device 601 of FIG. 6) according to an embodiment may include a first communication circuit (for example, the first communication circuit 311 of FIG. 3 or the first communication circuit 611 of FIG. 6) configured to support a first communication scheme, a second communication circuit (for example, the second communication circuit 313 of FIG. 3 or the second communication circuit 613 of FIG. 6) configured to support a second communication scheme, and at least one processor connected to the first communication circuit and the second communication circuit (for example, the processor 120 of FIG. 1 or the processor 320 of FIG. 3), and the at least one processor may be configured to enable first communication of the first communication scheme control the first communication circuit to perform the first communication with an external device (for example, the electronic device 102 of FIG. 1 or the external electronic device 102 or 103 of FIG. 2), enable second communication of the second communication scheme when first information related to a network state of the first communication satisfies a first predetermined condition, acquire second information related to the second communication, and modify the channel map by blocking one of a plurality of channels in the channel map when the second information satisfies a second predetermined condition.

According to an embodiment, the processor may be configured to not block the one of the plurality of channels in the channel map when the second information does not satisfy the second predetermined condition.

According to an embodiment, the electronic device may further include a first antenna, a second antenna, and the second communication circuit and a third communication circuit configured to support the second communication scheme, and the first antenna may be selectively connected to the first communication circuit or the second communication circuit, and the second antenna may be connected to the third communication circuit.

According to an embodiment, the electronic device may further include a switch configured to selectively connect the first communication circuit or the second communication circuit to the first antenna. The first information may include identification information of the first channel, a PER of the first channel, and information on a signal strength, and the second information includes identification information of the second communication, channel information of the second communication, and information on a signal strength of the second communication.

According to an embodiment, the processor may be configured to perform channel hopping in a plurality of unblocked channels in the channel map of the first communication in predetermined time units while the first communication is performed in response to enabling the first communication.

According to an embodiment, the first predetermined condition may include a condition that a PER of each of unblocked channels among the plurality of channels in the channel map is greater than or equal to a predetermined error rate or information on a signal strength of each of the unblocked channels is less than or equal to a predetermined value.

According to an embodiment, the processor may be configured to enable the second communication when a number of available channels among the plurality of channels in the channel map is less than or equal to a predetermined reference number.

According to an embodiment, the processor may be configured to identify that the first channel has interference by the second communication when the second information satisfies the second predetermined condition.

According to an embodiment, the processor may be configured to, when the first predetermined condition is satisfied and a number of channels for hopping among the plurality of channels in the channel map is less than or equal to a predetermined value, unblock at least one channel among the plurality of channels in the channel map of the first communication, generate a channel map which reflects at least one unblocked channel, and change the channel map of the first communication to the generated channel map.

According to an embodiment, the first communication scheme may be BT, and the second communication scheme may be Wi-Fi.

Figure 7:
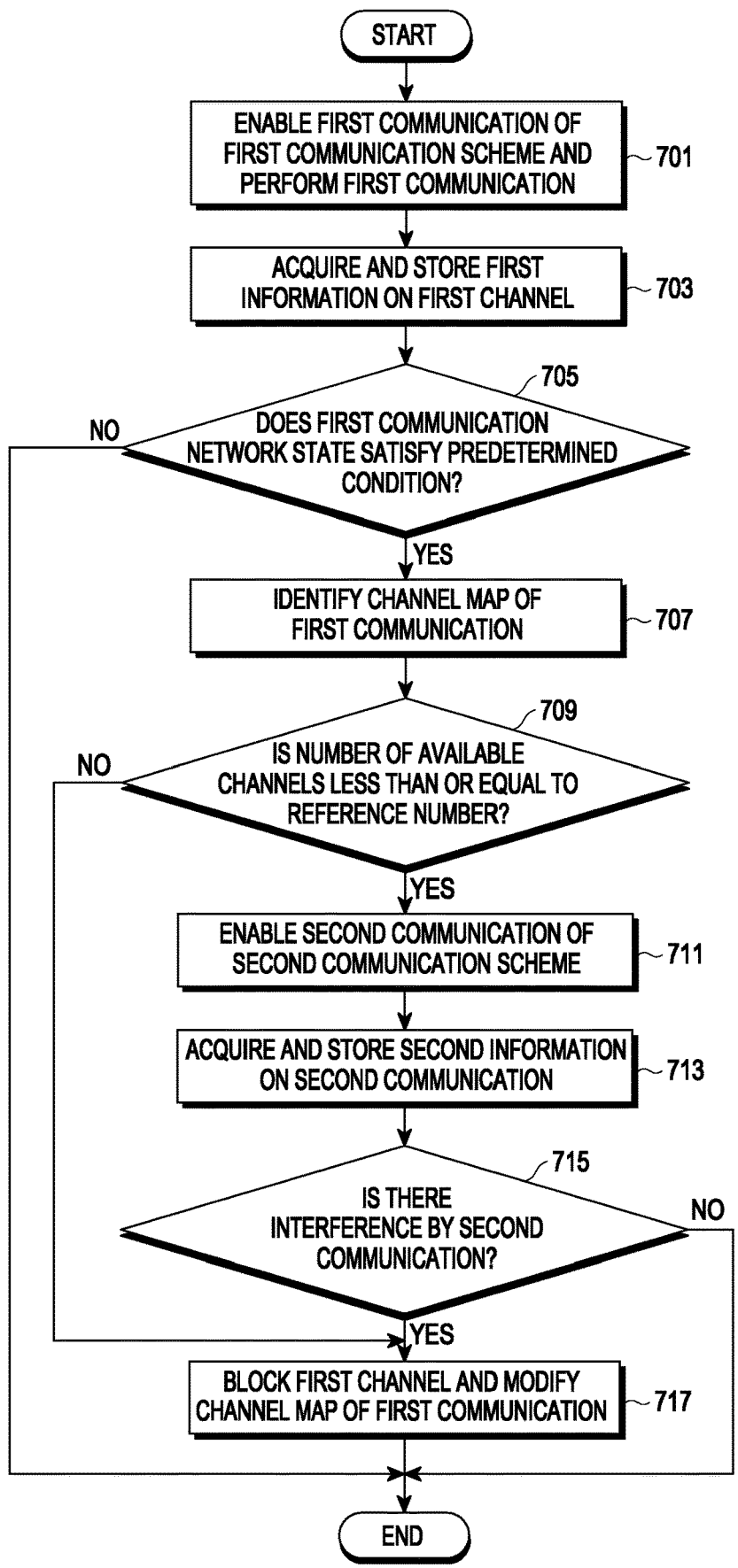
FIG. 7 illustrates an example of the operation of an electronic device according to an embodiment.

FIG. 7 illustrates an example of the operation of an electronic device according to an embodiment.

Referring to FIG. 7, in operation 701, an electronic device (for example, the electronic device 101 of FIG. 1, 2, or 3) according to an embodiment may enable first communication (for example, BT) of a first communication scheme.

The electronic device according to an embodiment may perform channel hopping based on a channel map of the first communication. The channel map of the first communication may be configured to randomly perform channel hopping according to a preset rule. For example, the channel map of the first communication may be a channel table configured to perform channel hopping using a channel having a good channel state without using a channel having a poor channel state according to a communication network state. The electronic device may perform channel hopping separately from the following operations (operations 703 to 717) and continuously perform channel hopping in a plurality of channels in the channel map regardless of a channel environment during the first communication.

In operation 703, the electronic device may acquire $n^{th}$ information (hereinafter, referred to as first information) on an $n^{th}$ channel (hereinafter, referred to as a first channel) according to channel hopping using adaptive frequency hopping and store the acquired first information in a memory (for example, the memory 130 of FIG. 1) of the electronic device. For example, the first information may include at least one of a PER of the first channel or information on the RSSI of the first channel. The first channel may be at least one unblocked channel in the channel map of the first communication.

In operation 705, the electronic device may identify whether a network state of the first communication satisfies a predetermined condition. The predetermined condition (for example, a first predetermined condition) may be a predetermined condition based on a PER for each of a plurality of unblocked channels in the channel map and/or a signal strength thereof. For example, the predetermined condition may include a condition that a PER of each of unblocked channels among the plurality of channels in the channel map is greater than or equal to a predetermined RSSI on the signal strength of each of the unblocked channels is less than or equal to a predetermined value.

When the predetermined condition is satisfied based on the identification result of operation 705, the electronic device may identify the channel map of the first communication in operation 707. The electronic device may identify information on the blocked channel among the plurality of channels in the channel map of the first communication.

When the predetermined condition is not satisfied based on the identification result of operation 705, the electronic device may end the method.

In operation 709, the electronic device may identify the number of channels which can be used in the channel map of the first communication and identify whether the number of identified channels which can be used is less than or equal to a predetermined reference number (for example, 40 (40 MHz)). For example, an available channel may be a channel which can perform hopping. When the number of available channels is less than or equal to the predetermined reference number based on the identification result, the electronic device may perform operation 711. When the number of available channels is greater than the predetermined reference number, the electronic device may perform operation 717.

In operation 711, the electronic device may enable second communication of a second communication scheme based on the acquired first information and information on the identified blocked channels (for example, the number of blocked channels identified in the channel map).

In operation 713, the electronic device may acquire and store second information related to the second communication in response to enabling the second communication. For example, the second information may include channel identification information of the second communication and/or information on the signal strength of the second communication.

In operation 715, the electronic device may identify whether there is interference by the second communication in channels included in the channel map. When there is interference by the second communication based on the identification result, the electronic device may perform operation 717. When there is no interference by the second communication, the electronic device may end the method.

In operation 717, the electronic device may reflect blocking of a channel (for example, a first channel) having interference by the second communication and modify the channel map of the first communication. Thereafter, the method ends.

According to an embodiment described with reference to FIG. 7, when there is no interference by the second communication, the electronic device may block another channel having a poor channel state among the channels in the channel map of the first communication and modify the channel map of the first communication by reflecting the other blocked channel. For example, the modified channel map of the first communication does not reflect blocking of the first channel.

Figure 8:
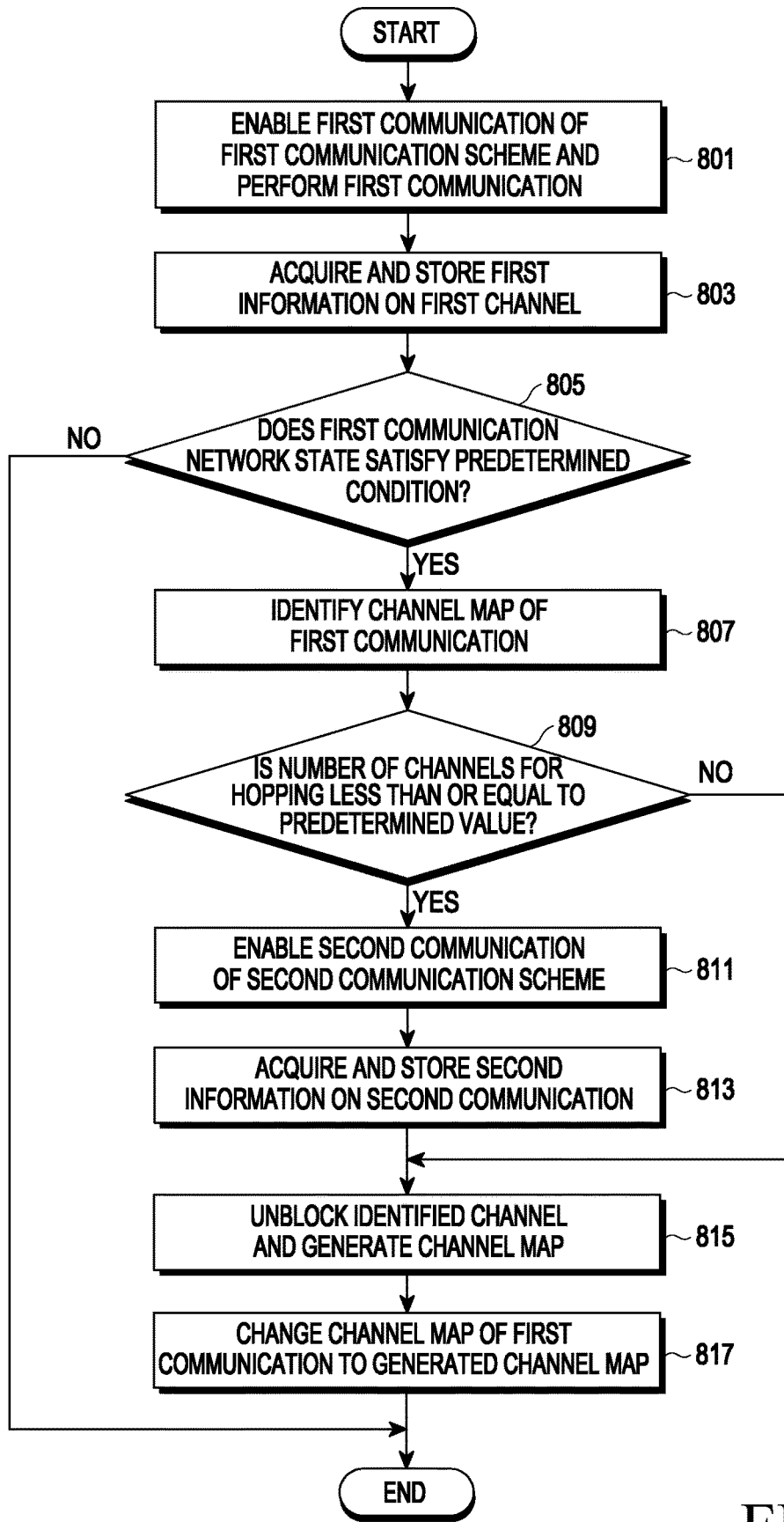
FIG. 8 illustrates an example of the operation of an electronic device according to an embodiment.

FIG. 8 illustrates an example of the operation of an electronic device according to an embodiment.

Referring to FIG. 8, in operation 801, an electronic device (for example, the electronic device 101 of FIG. 1, 2, or 3) according to an embodiment may enable first communication (for example, BT) of a first communication scheme.

The electronic device according to an embodiment may perform channel hopping based on a channel map of the first communication. The channel map of the first communication may be configured to randomly perform channel hopping according to a preset rule. For example, the channel map of the first communication may be a channel table configured to perform channel hopping using a channel having a good channel state without using a channel having a poor channel state according to a communication network state. The electronic device may perform channel hopping separately from the following operations (operations 803 to 817) and continuously perform channel hopping in a plurality of channels in the channel map regardless of a channel environment during the first communication.

In operation 803, the electronic device may acquire $n^{th}$ information (hereinafter, referred to as first information) on an $n^{th}$ channel (hereinafter, referred to as a first channel) according to channel hopping using adaptive frequency hopping and store the acquired first information in a memory (for example, the memory 130 of FIG. 1) of the electronic device. For example, the first information may include at least one of a PER of the first channel or the RSSI of the first channel. The first channel may be at least one unblocked channel in the channel map of the first communication.

In operation 805, the electronic device may identify whether a network state of the first communication satisfies a predetermined condition (for example, a first predetermined condition). The predetermined condition (for example, a first predetermined condition) may be a predetermined condition based on a PER for each of a plurality of unblocked channels in the channel map and/or a signal strength. For example, the predetermined condition may include a condition that a PER of each of unblocked channels among the plurality of channels in the channel map is greater than or equal to a predetermined error rate or RSSI on the signal strength of each of the unblocked channels is less than or equal to a predetermined value.

When the predetermined condition is satisfied based on the identification result of operation 805, the electronic device may identify the channel map of the first communication in operation 807. The electronic device may identify information on the blocked channel among the plurality of channels in the channel map of the first communication.

When the predetermined condition is not satisfied on the basis of the identification result of operation 805, the electronic device may end the method.

In operation 809, the electronic device may identify whether the number of channels for hopping in the identified channel map is less than or equal to a predetermined value. The predetermined value may be the minimum number of channels for hopping or unblocked channels among the channels in the channel map of the first communication. When the number of channels for hopping is less than or equal to the predetermined value based on the identification result, the electronic device may perform operation 811. When the number of channels for hopping is greater than the predetermined value, the electronic device may perform operation 815.

In operation 811, the electronic device may enable the second communication of the second communication scheme.

In operation 813, the electronic device may acquire and store second information related to the second communication in response to enabling the second communication. For example, the second information may include channel identification information of the second communication and/or information on the signal strength of the second communication.

In operation 815, the electronic device may unblock the identified channel among the plurality of channels in the channel map of the first communication and generate a new channel map which reflects the unblocked channel. The electronic device may identify at least one channel to be unblocked among the plurality of channels in the channel map of the first communication based on the first information and/or the second information. For example, when unblocking the identified channel, the electronic device may identify whether the identified channel has interference by the second communication. When there is no interference by the second communication, the electronic device may unblock the identified channel.

In operation 817, the electronic device may change the channel map of the first communication to the new channel map. Since the electronic device randomly performs channel hopping with an external electronic device (for example, a slave device) according to a preset rule, the external electronic device may also change the channel map of the first communication to the new channel map. After operation 817, the electronic device may end the method.

According to an embodiment described with reference to FIG. 8, the electronic device may identify at least one channel (for example, a second channel having a high priority of channel usage based on the first information and/or the second information and unblock at least one identified channel. For example, the priority of the channel usage may be determined based on whether there is interference by the second communication, a PER of the first communication, or a signal strength.

A method of operating an electronic device (for example, the electronic device 101 of FIG. 1, 2, or 3, or the electronic device 601 of FIG. 6) according to an embodiment may include an operation of enabling first communication of a first communication scheme and performing the first communication with an external device (for example, the electronic device 102 of FIG. 1, or the external electronic device 102 or 103 of FIG. 2), an operation of, when first information related to a network state of the first communication satisfies a first predetermined condition, enabling second communication of a second communication scheme, based on a channel map of the first communication, an operation of acquiring second information related to the second communication, and an operation of, when the second information satisfies a second predetermined condition, modifying the channel map by blocking one of a plurality of channels in the charnel map.

According to an embodiment, the method may further include an operation of, when the second information does not satisfy the second predetermined condition, refraining from blocking the one of the plurality of channels in the channel map.

According to an embodiment, the method may further include an operation of performing channel hopping in a plurality of unblocked channels in the channel map of the first communication in predetermined time units while the first communication is performed in response to enabling the first communication.

According to an embodiment, the first information may include identification information of the first channel, a PER of the first channel, and information on a signal strength, and the second information may include identification information of the second communication, channel information of the second communication, and information on a signal strength of the second communication.

According to an embodiment, the first predetermined condition may include a condition that a PER of each of unblocked channels among the plurality of channels in the channel map is greater than or equal to a predetermined error rate or the RSSI of each of the unblocked channels is less than or equal to a predetermined value.

According to an embodiment, the operation of enabling the second communication of the second communication scheme may include an operation of enabling the second communication when a number of available channels among the plurality of channels in the channel map is less than or equal to a predetermined reference number.

According to an embodiment, the method may further include an operation of, when a number of channels for hopping among the plurality of channels in the channel map is less than or equal to a predetermined value, enabling the second communication, unblocking at least one channel among the plurality of channels in the channel map of the first communication, an operation of generating a channel map which reflects the at least one unblocked channel, and an operation of changing the channel map of the first communication to the generated channel map.

According to an embodiment, the first communication scheme may be BT, and the second communication scheme may be Wi-Fi.

A computer-readable storage medium may include a hard disk, a floppy disk, magnetic media (for example, a magnetic tape), optical media (for example, a compact disc read only memory (CD-ROM) and a digital versatile disc (DVD)), magneto-optical media (for example, a floptical disk), a hardware device (for example, a read only memory (ROM), a random access memory (RAM), a flash memory), and the like. In addition, the program instructions may include high class language codes, which can be executed in a computer by using an interpreter, as well as machine codes made by a compiler. The hardware device may operate as one or more software modules to perform the operation according to various embodiments, and vice versa.

In a non-transitory recording medium according to an embodiment, the program may include instructions causing a processor to, when executed by the processor, enable first communication of a first communication scheme and perform the first communication with an external device through a first channel, enable second communication of a second communication scheme based on first information on the first channel, acquire second information related to the second communication, and hop from the first channel to a second channel based on the second information and block the first channel.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been particularly shown and described with reference to certain embodiments thereof, it will be understood by those skilled in the art that various changes in form and details may be made therein without departing from the scope of the subject matter as defined by the appended claims and their equivalents.

What is claimed is:

1. An electronic device comprising:
a first communication circuit configured to support a first communication scheme;
a second communication circuit configured to support a second communication scheme; and
at least one processor connected to the first communication circuit and the second communication circuit,
wherein the memory stores instructions configured to, when executed, enable the processor to:
enable first communication of the first communication scheme,
control the first communication circuit to perform the first communication with an external device,
enable second communication of the second communication scheme based on a channel map of the first communication when first information related to a network state of the first communication satisfies a first predetermined condition,
acquire second information related to the second communication, and
modify the channel map by blocking one of a plurality of channels in the channel map when the second information satisfies a second predetermined condition.

2. The electronic device of claim 1, wherein the instructions are further configured to enable the processor not to block the one of the plurality of channels in the channel map when the second information does not satisfy the second predetermined condition.

3. The electronic device of claim 1, further comprising:
a first antenna;
a second antenna; and
the second communication circuit and a third communication circuit configured to support the second communication scheme,
wherein the first antenna is selectively connected to the first communication circuit or the second communication circuit, and the second antenna is connected to the third communication circuit.

4. The electronic device of claim 1, further comprising a switch configured to selectively connect the first communication circuit or the second communication circuit to the first antenna.

5. The electronic device of claim 1,
wherein the first information includes identification information of the first channel, a packet error rate of the first channel, and information on a signal strength of the first communication, and
wherein the second information includes identification information of the second communication, channel information of the second communication, and information on a signal strength of the second communication.

6. The electronic device of claim 1,
wherein the instructions are further configured to enable the processor to perform channel hopping in a plurality of unblocked channels in the channel map of the first communication in predetermined time units while the first communication is performed in response to enabling the first communication.

7. The electronic device of claim 1,
wherein the first predetermined condition includes a condition that a packet error rate of each of unblocked channels among the plurality of channels in the channel map is greater than or equal to a predetermined error rate or information on a signal strength of each of the unblocked channels is less than or equal to a predetermined value.

8. The electronic device of claim 1,
wherein the instructions are further configured to enable the processor to enable the second communication when a number of available channels among the plurality of channels in the channel map is less than or equal to a predetermined reference number.

9. The electronic device of claim 1,
wherein the instructions are further configured to enable the processor to identify that, the first channel has interference by the second communication when the second information satisfies the second predetermined condition.

10. The electronic device of claim 1,
wherein the instructions are further configured to enable the processor to:
enable the second communication when a number of channels for hopping among the plurality of channels in the channel map is less than or equal to a predetermined value,
unblock at least one channel among the plurality of channels in the channel map of the first communication,
generate a channel map which reflects the at least one unblocked channel, and
change the channel map of the first communication to the generated channel map.

11. The electronic device of claim 1,
wherein the first communication scheme is Bluetooth™, and
wherein the second communication scheme is wireless fidelity.

12. A method of operating an electronic device, the method comprising:
enabling first communication of a first communication scheme and performing the first communication with an external device;
when first information related to a network state of the first communication satisfies a first predetermined condition, enabling second communication of a second communication scheme based on a channel map of the first communication;
acquiring second information related to the second communication; and
when the second information satisfies a second predetermined condition, modifying the channel map by blocking one of a plurality of channels in the channel map.

13. The method of claim 12, further comprising, when the second information does not satisfy the second predetermined condition, refraining from blocking the one of the plurality of channels in the channel map.

14. The method of claim 12, further comprising performing channel hopping in a plurality of unblocked channels in the channel map of the first communication in predetermined time units while the first communication is performed in response to enabling the first communication.

15. The method of claim 12,
wherein the first information includes identification information of the first channel, a packet error rate of the first channel, and information on a signal strength.

16. The method of claim 12,
wherein the second information includes identification information of the second communication, channel information of the second communication, and information on a signal strength of the second communication.

17. The method of claim 12,
wherein the first predetermined condition includes a condition that a packet error rate of each of unblocked channels among the plurality of channels in the channel map is greater than or equal to a predetermined error rate or information on a signal strength of each of the unblocked channels is less than or equal to a predetermined value.

18. The method of claim 12,
wherein the second communication is enabled when a number of available channels among the plurality of channels in the channel map is less than or equal to a predetermined reference number.

19. The method of claim 12, further comprising:
when a number of channels for hopping among the plurality of channels in the channel map is less than or equal to a predetermined value; enabling the second communication;
unblocking at least one channel among the plurality of channels in the channel map of the first communication;
generating a channel map which reflects the at least one unblocked channel; and
changing the channel map of the first communication to the generated channel map.

20. The method of claim 12,
wherein the first communication scheme is Bluetooth™, and the second communication scheme is wireless fidelity.

* * * * *